United States Patent [19]

Chen

[11] Patent Number: 4,989,241
[45] Date of Patent: Jan. 29, 1991

[54] MEMORY DIAL TELEPHONE FINDER

[76] Inventor: Stanley Chen, No. 37, Lane 149, Nankang Rd., Sec. 3, Taipai, Taiwan

[21] Appl. No.: 366,718

[22] Filed: Jun. 15, 1989

[51] Int. Cl.$^5$ .............................................. H04M 1/00
[52] U.S. Cl. .................................... 379/357; 379/354; 379/216
[58] Field of Search .............. 379/354, 355, 357, 242, 379/216

[56] References Cited

U.S. PATENT DOCUMENTS

| | | | |
|---|---|---|---|
| 4,164,630 | 8/1979 | Brodbeck | 379/357 |
| 4,243,845 | 1/1981 | Feinberg et al. | 379/355 |
| 4,277,651 | 7/1981 | Fisher, II et al. | 379/354 |
| 4,278,845 | 7/1981 | Chiou | 379/355 |
| 4,408,101 | 10/1983 | Brodbeck | 379/357 |
| 4,409,440 | 10/1983 | Brodbeck | 379/357 |
| 4,595,798 | 6/1986 | Brodbeck | 379/357 |
| 4,800,584 | 1/1989 | Kitanishi | 379/355 |

*Primary Examiner*—Jin F. Ng
*Assistant Examiner*—Jhancy Augustus
*Attorney, Agent, or Firm*—Lowe, Price, LeBlanc, Becker & Shur

[57] ABSTRACT

A memory dial telephone finder includes a casing integrally made on the mainframe of a microprocessor controlled telephone system, which casing is having two guide posts set at both lateral sides for positioning therebetween of a plurality of telephone number index cards, which index cards are having cuttings for quick finding. A plurality of memory keys are mounted on the mainframe in front of the casing to respectively control the mainframe memory which is having the data of the telephone numbers stored therein. A cover which is pivoted to the casing and controlled by an expansion spring to be in a normal open position is having a raid made at the front inner side for sliding therealong of a snapper, and a plurality of locating holes for alternatively positioning of the snapper. A stop plate is pivoted to the casing at the inner front position and pressed by a torsional spring to be in a position constantly retained with the cover. A snapper slidably which is mounted on the front edge of the cover is having a press key, through which the cover is operated to show the selected index card, and the matrix in the mainframe memory of the telephone system is turned on. Upon pressing on the associated number key of the telephone system, the telephone system will automatically execute the dialing process.

1 Claim, 3 Drawing Sheets

MEMORY DIAL TELEPHONE FINDER

BACKGROUND OF THE INVENTION

The present invention is related to a memory dial telephone finder and more particularly to a telephone finder which is having telephone number index cards set therein. When the telephone finder is opened, the memory matrix in the mainframe memory of the associated telephone system is automatically turned on, such that the telephone system will automatically execute the dialing process upon the selected number key is pressed down.

Conventional telephone finders are innumerable, some of which are used an integral part of a microprocessor controlled telephone system. The U.S. Pat. No. 4,278,845 discloses a kind of telephone finder used to match with a microprocessor controlled telephone system. In the U.S. Pat. No. 4,278,845 the slider button, which controls the opening of the cover plate, and the hook means, which is to hook on the telephone number index cards, both are separately made. Which in operation to close the cover plate, the pin of the hook means is easy to break while striling against the transverse plate of the slider button. Further, during operation, more particularly when the pin of the hook means is broken, the frequency of error dialing is very high.

SUMMARY OF THE INVENTION

The main object of the present invention is to provide a memory dial telephone number for use to match with microprocessor controlled telephone system, which is easy to operate, helps to facilitate dialing process, and minimizes the frequency of erroe dialing, wherein by means of the operation of a press key which is mounted on the cover, the desired telephone number index card and the matrix in the mainframe memory of the telephone system is concomitantly obtained.

According to the present invention, a memory dial telephone finder is including a casing integrally made on the mainframe of a microprocessor controlled telephone system, which casing is having two guide posts set at both lateral sides for positioning therebetween of a plurality of telephone number index cards, which index cards are having cuttings for quick findg. A plurality of memory keys are mounted on the mainframe in front of the casing to respectively control the mainframe memory which is having the data of the telephone numbers stored therein. A cover which is pivoted to the casing and controlled by an expansion spring to be in a normal open position is having a rail made at the front inner side for sliding therealong of a snapper, and a plurality of locating holes for alternatively positioning of the snapper, A stop plate is pivoted to the casing at the inner front position and pressed by a torsional spring to be in a position constantly retained with the cover. A snapper slidably which is mounted on the front edge of the cover is having a press key, through which the cover is operated to show the selected index card, and the matrix in the mainframe memory of the telephone system is turned on. Upon pressing on the associated number key of the telephone system, the telephone system will automatically execute the dialing process.

The present invention will become fully understood from the following detailed description of the preferred embodiment, considered in connection with the annexed drawing as hereunder.

DETAILED DESCRIPTION OF THE PREFERRED EMBODIMENTS

Figure 1:
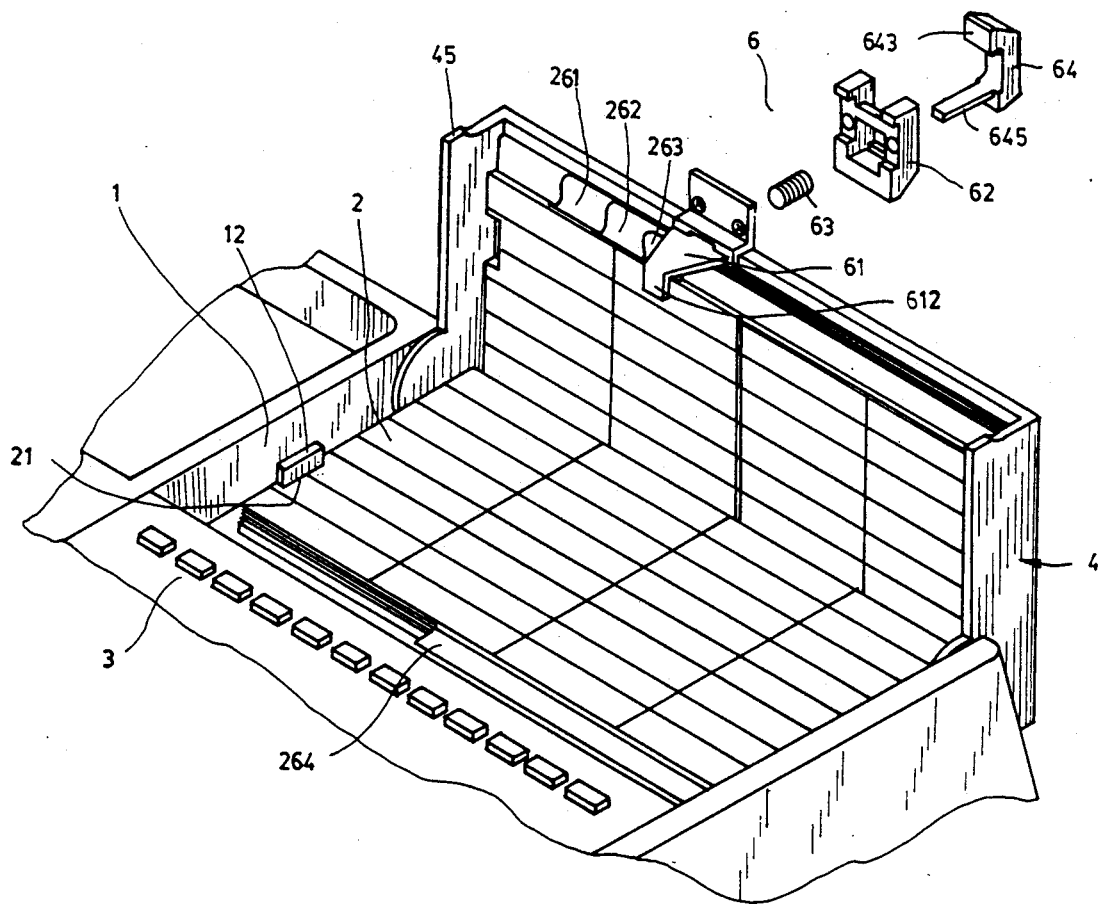
FIG. 1 a perspective view of a telephone finder according to the present invention, wherein the cover has been lifted to show the inner compartment.
Figure 2:
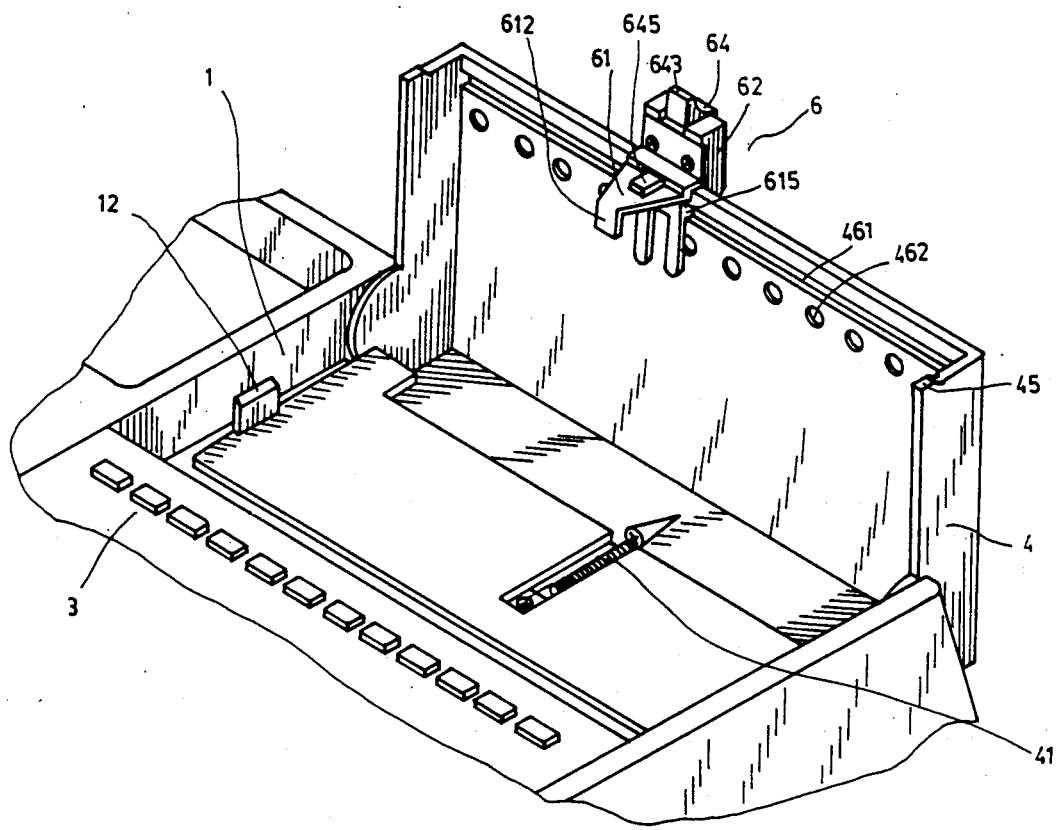
FIG. 2 is a perspective view of the embodiment of FIG. 1, wherein the index cards have been removed.
Figure 3:
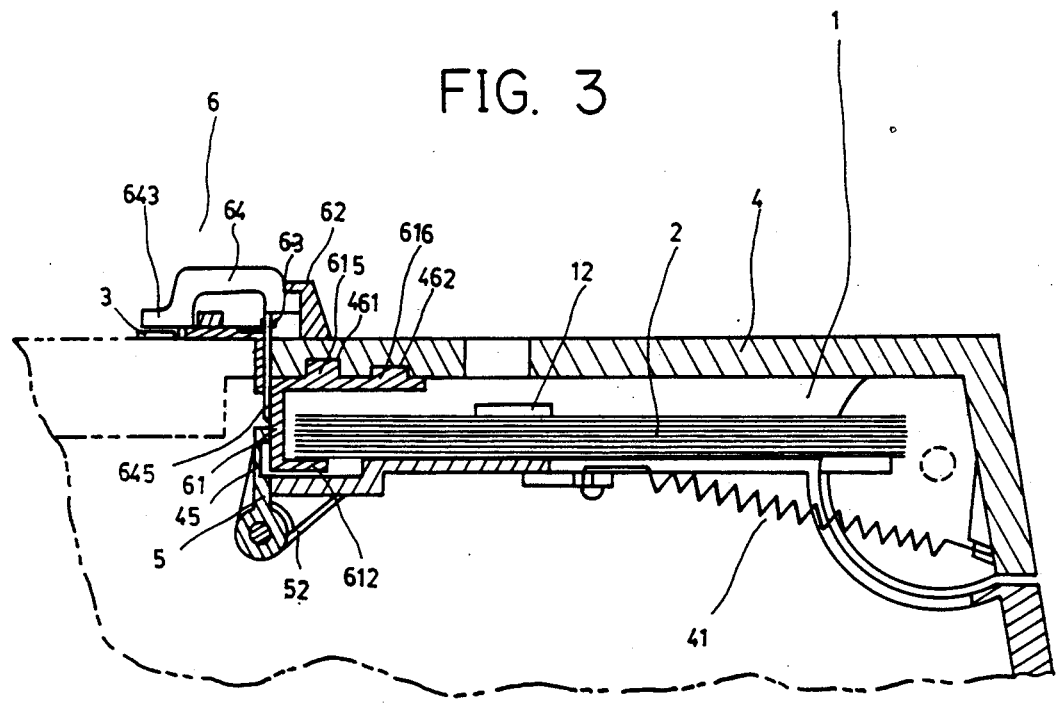
FIG. 3 is a side sectional view taken in FIG. 1.
Figure 4:
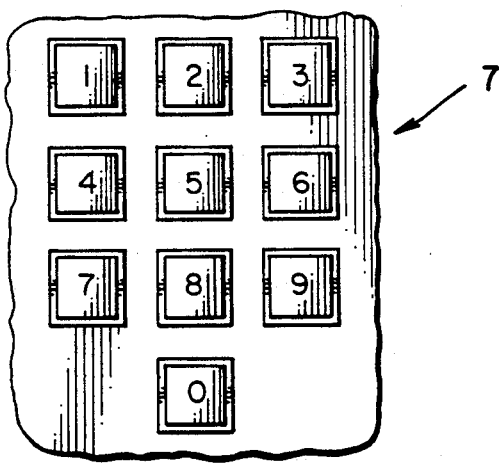
FIG. 4 is a presentation of the number keys of a telephone system.

Referring to FIGS. 1 through 3, a telephone finder is including a casing (1) integrally made on the mainframe of a microprocessor controlled telephone system (7), having set therein a plurality of telephone number index cards (2). A plurality of memory keys (3) are mounted on the mainframe to respectively connect to the microprocessor of the telephone system. A cover (4) is pivotally connected with the casing (1) to pivot therein. A stop plate (5) is pivoted to the casing (1) and set at the bottom. A sliding snapper (6) is mounted on the cover (4) to slide along a rail (461) which is made on the front edge of the cover (4). The casing (1) is having a recessed front edge near the stop plate (5), through which the hook means (61) of the sliding snapper (6) is driven to move. Two guide posts (12) are made on the casing (1) at both lateral sides for positioning thereto of the index cards (2) through the notches (21). The index cards (201), (202) . . . are having stepped cuttings (261), (262) . . . to respectively match with the memory keys (3). The memory keys (3) are to respectively control the operation of the axes of the matrix in the memory of the telephone system from X1, X2 . . . through Xn, wherein the axes X1, X2 through Xn are having respectively stored therein the full page of telephone number of pivot therein. A stop plate (5) is pivoted to the casing (1) and set at the bottom. A sliding snapper (6) is mounted on the cover (4) to slide along a rail (461) which is made on the front edge of the cover (4). The casing (1) is having a recessed front edge near the stop plate (5), through which the hook means (61) of the sliding snapper (6) is driven to move. Two guide posts (12) are made on the casing (1) at both lateral sides for positioning thereto of the index cards (2) through the notches (21). The index cards (201), (202) . . . are having stepped cuttings (261), (262) . . . to respectively match with the memory keys (3). The memory keys (3) are to respectively control the operation of the axes of the matrix in the memory of the telephone system from X1, X2 . . . through Xn, wherein the axes X1, X2 through Xn are having respectively stored therein the full page of telephone number of the corresponding index cards 201, 202 . . . etc. The axes of the matrix in the memory of the telephone system from Y1, Y2 . . . through Yn are respectively controlled through the number keys 1, 2 . . . through 0 of the telephone system. An expansion spring (41) is mounted on the casing to automatically pull the cover (4) to open when the cover (4) is released. In addition to the rail (461), the cover (4) is having two retainer means (45) set at both lateral sides in the front part to retain with the stop plate (5), and a plurality of locating holes (462) set in the front along the rail (461). The stop plate (5) is pivoted to the casing (1), comprising two notches (54) to match with the two retainer means (45) of the cover (4). The stop plate (5) is constantly pressed by a torsional spring (52) to be in a position firmly retained with the cover (4) so as to let the cover (4) be kept in a normal closed position. The snapper (6) is comprising a hook means (61) to slide along the rail (461), a positioning plate (62) slidably mounted on the top of the cover (4), a return spring (63) set in the positioning plate (62), and a press key (64) movably set in the positioning plate (62). The hook means (61) which is connected with the positioning plate (62) by means of screw joint to clamp up the front edge of the cover (4) is having a curved front end (612) to retain the indez cards (2). The hook means (61) is also having an elongated extension (615) made thereon to slide along the rail (461), and noses (616) properly arranged to althernatively set in the locating holes (462) of the cover (4) to help positioning of the snapper (6) at the cover (4). The press key (64) is including a front end (643) and a rear end (645). The front end (643) is alternatively set at the top of the memory keys (3) to turn on the Axis-X of the matrix of the memory of the telephone system. The rear end (645) is having the return spring (63) mounted thereon, which return spring (63) is pressed against the top surface of the cover (4) to let the press key (64) be kept inside the positioning plate (62) at the upper limit position. When the press key (64) is pressed down, the rear end (645) will push the stop plate (5) aside to let the cover (4) be released.

When in operation, the snapper (6) is shifted to let the hook means (61) slide along the rail (461) of the cover. By means of the noses (616) selectively set in the locating holes (462), the snapper (6) is firmly positioned at the position where the index card is required. When the press key (64) is pressed down, the rear end (645) will push the stop (5) aside to release the cover (4), and the front end (643) will press on the selected memory key (3) to turn on the Axis-X of the matrix in the memory of the telephone system. As soon as the finger is released from the press key (64) of the snapper (6), the press key (64) will be pushed by the return spring (63) to return to original position, and at the same time, the cover will be pulled by the expansion spring (41) to open automatically so as to let the hook means (61) of the snapper (6) hook on the index card required and the other index cards above the required index card, and the stop plate (5) will be forced by the torsional spring (52) to return to original position. Therefore, when the required index card is presented, the Axis-X of the matrix in the memory of the telephone system is automatically turned on. At this moment, one can just simply press on the assigned number key 1, 2, 3 . . . or 0 of the telephone system, the Axis-X of the matrix in the memory of the telephone system will be automatically turned on and, the telephone system will automatically perform the dialing process.

I claim:

1. A memory dial telephone finder including a casing integrally made on the main frame of a microprocessor controlled telephone system said system including a keyboard operably coupled to the Y-axis matrix of the mainframe memory; a plurality of telephone number index cards having stepped edges set in said casing; a plurality of memory keys operably connected to the X-axis matrix of the mainframe memory; a cover pivotally mounted on said casing; a stop plate pivotally mounted on said casing; and a snapper slidably mounted on said cover said cover defining a rail along an inner side and said snapper being slidably mounted on the rail, and a plurality of locating holes along the inner side of the rail for alternately positioning said snapper having a press key and a hook extending into the stepped edges of said cards; said keypad; said keypad having number keys of 0 through 9 and the memory keys being operated by a press key on said snapper said snapper mounted a positioning plate mounted thereon said positioning plate extending from the top of said cover and said hook means depending from said cover, said press key being movably set in said positioning plate to selectively press memory keys and a return spring coupling said press key and said positioning plate; an expansion spring mounted on the casing and coupled to the cover; retaining means normally retaining said cover against said casing in a closed position and for releasing said cover responsive to depression of said press key whereby said cover is released and said snapper hooks the required number index cards for identification and operates the selected memory key to turn on the memory matrix axis and the telephone identification can be entered on the Y-axis at the keypad.

* * * * *